United States Patent
McFadden et al.

[15] 3,680,754
[45] Aug. 1, 1972

[54] FILMSTRIP ADVANCING MECHANISM

[72] Inventors: Robert N. McFadden, Fairport; Frank L. Blaakman, Rochester, both of N.Y.

[73] Assignee: Graflex, Inc., Rochester, N.Y.

[22] Filed: Sept. 30, 1970

[21] Appl. No.: 76,764

[52] U.S. Cl. ................226/76, 226/127, 352/163
[51] Int. Cl. .............................................G03b 1/42
[58] Field of Search .........226/116, 76, 127; 352/163

[56] References Cited

UNITED STATES PATENTS

| | | |
|---|---|---|
| 1,738,762 | 12/1929 | De Vault..................352/163 X |
| 2,037,454 | 4/1936 | Boecking....................352/163 |
| 2,534,731 | 12/1950 | Perillo......................352/163 X |
| 2,458,346 | 1/1949 | Charlin....................352/163 X |
| 3,003,393 | 10/1961 | Kilday.....................352/163 X |

*Primary Examiner*—Allen N. Knowles
*Attorney*—Cumpston, Shaw & Stephens

[57] ABSTRACT

A filmstrip advancing mechanism has a sprocket turned on a shaft carrying a sleeve with a clutch between the sleeve and the shaft. A knob turns the shaft and is movable axially to disengage the clutch for turning the shaft relative to the sleeve. The sleeve is detentable to stop the shaft at successive frame positions of the filmstrip. The sleeve carries a ratchet having a number of teeth equal to the number of detent stops, and a pivotally reciprocal pawl is mounted on the projector to engage and advance the ratchet teeth for advancing the filmstrip. A solenoid depresses the pawl lever on a signal from a tape deck accompanying the projector, and a manual button is also arranged for actuating the pawl.

4 Claims, 7 Drawing Figures

PATENTED AUG 1 1972  3,680,754

ROBERT N. McFADDEN
FRANK L. BLAAKMAN
INVENTORS

BY Cumpston, Shaw
and Stephens

ATTORNEYS

ROBERT N. McFADDEN
FRANK L. BLAAKMAN
INVENTORS

BY Cumpston, Shaw
and Stephens

ATTORNEYS

ROBERT N. McFADDEN
FRANK L. BLAAKMAN
INVENTORS

BY Cumpston, Shaw and Stephens

ATTORNEYS

FILMSTRIP ADVANCING MECHANISM

THE INVENTIVE IMPROVEMENT

Simple front and rear screen filmstrip projectors are used increasingly in schools and elsewhere. Many of these projectors are used by children and must be simple, rugged and reliable.

The invention involves the recognition that filmstrip advancing mechanisms available for such projectors are less than optimum, and the invention includes a filmstrip advancing mechanism that is simple, economical, rugged, and reliable. The inventive filmstrip advancing mechanism allows both automatic and manual operation in simple and convenient ways, and it provides for quick and easy framing of the filmstrip.

SUMMARY OF THE INVENTION

The inventive filmstrip advancing mechanism uses a rotatable shaft with a sprocket for advancing the filmstrip and carrying a sleeve that is rotatable and axially movable on the shaft. The shaft and sleeve each carry a clutch part, and a spring biases the clutch parts together so the shaft normally turns with the sleeve. A knob for turning the shaft is axially movable to compress the spring to disengage the clutch for turning the shaft relative to the sleeve. The sleeve has circumferentially evenly spaced detentable regions, and a resilient detent engages these regions for stopping the sleeve at successive frame positions of the filmstrip. A ratchet on the sleeve has a number of teeth. The pawl is actuated either by a solenoid under automatic control or by a manual push-button.

DRAWINGS

DETAILED DESCRIPTION

Figure 1:
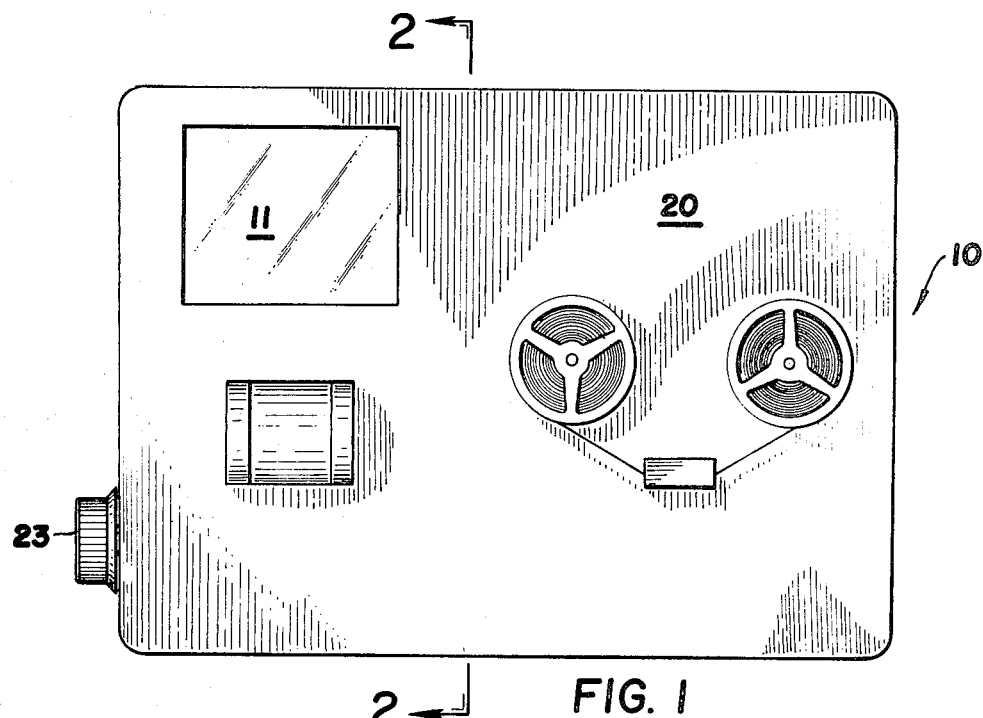
FIG. 1 is a partially schematic, front-elevational view of a preferred embodiment of a filmstrip projector using the inventive film advancing mechanism.
Figure 2:
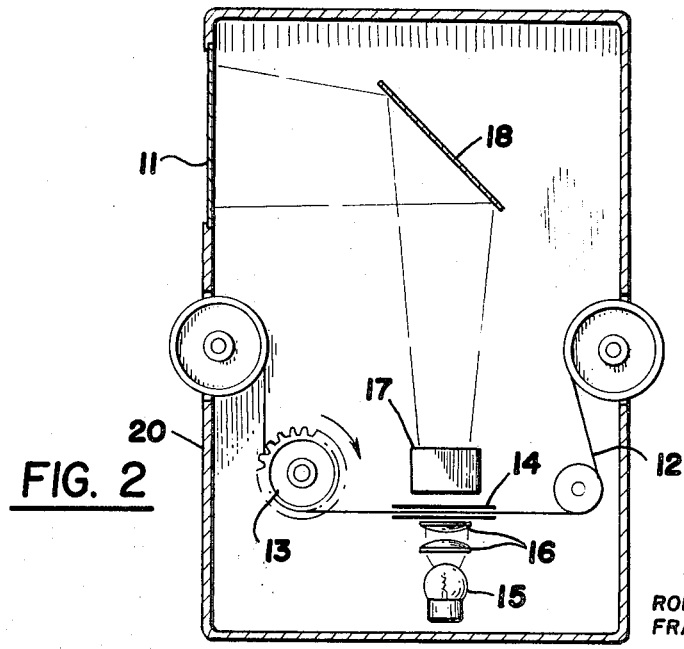
FIG. 2 is a partially schematic, cross-sectional view of the projector of FIG. 1 taken along the line 2 — 2 thereof.

Projector 10, as schematically illustrated, is a rear screen filmstrip projector for projecting an image from filmstrip 12 onto rear screen 11, (FIGS. 1 and 2). A sprocket 13 advances filmstrip 12 through film gate 14, and light from a source 15 is directed through condenser lenses 16, filmstrip 12, lens system 17, and mirror 18 which reflects a projected image onto rear screen 11. Sprocket 13 turns the proper amount to advance filmstrip 12 one frame at a time and such film advance is either manual through a push-button 39 (FIG. 3) or automatic under control of tape deck 20 which includes a synchronizer 19 for advancing filmstrip 12 in synchronization with a tape played in tape deck 20. A signal recorded on the tape is used by synchronizer 19 to actuate the inventive film advancing mechanism for such automatic advance.

Figure 3:
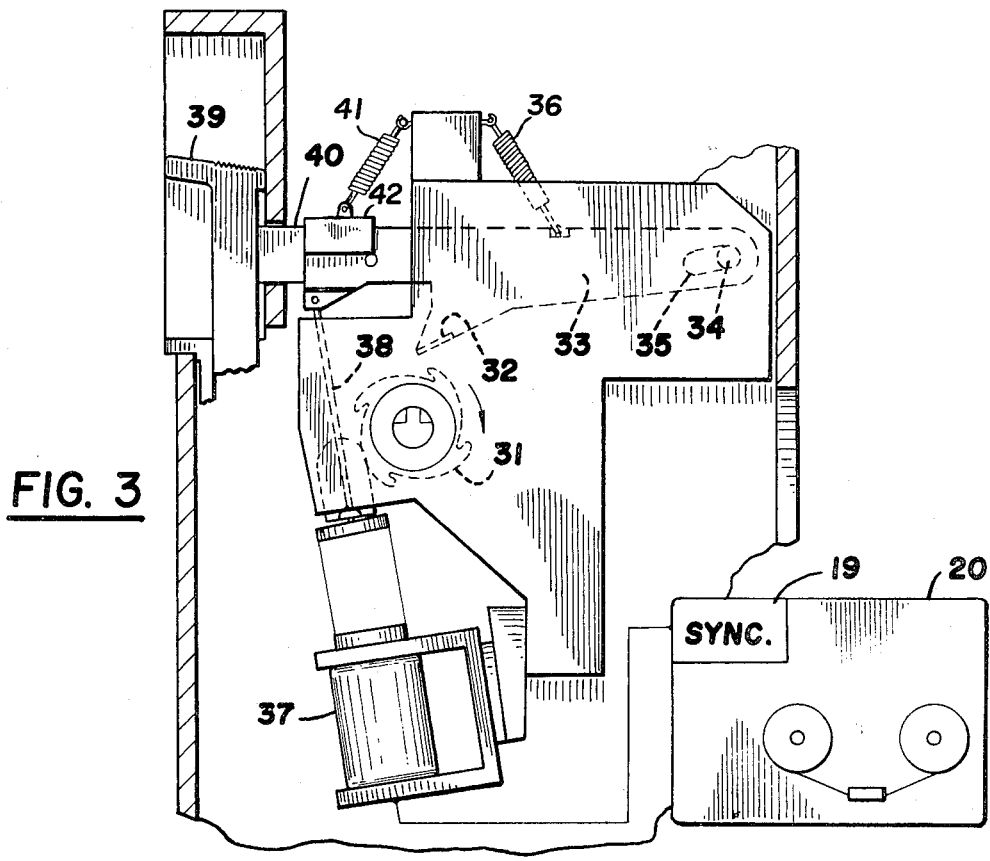
FIGS. 3 – 5 are partially sectioned, fragmentary views of a preferred embodiment of filmstrip advancing mechanism in the projector of FIG. 1.
Figure 4:
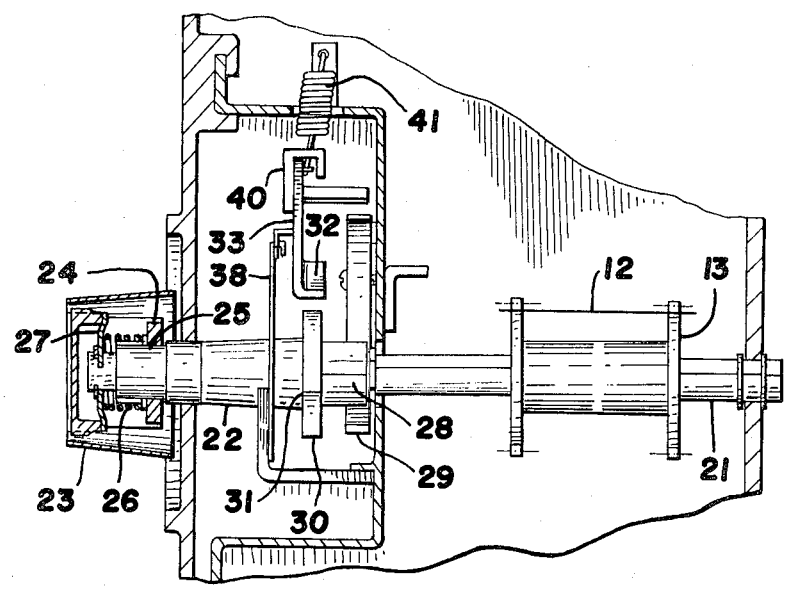
Figure 5:
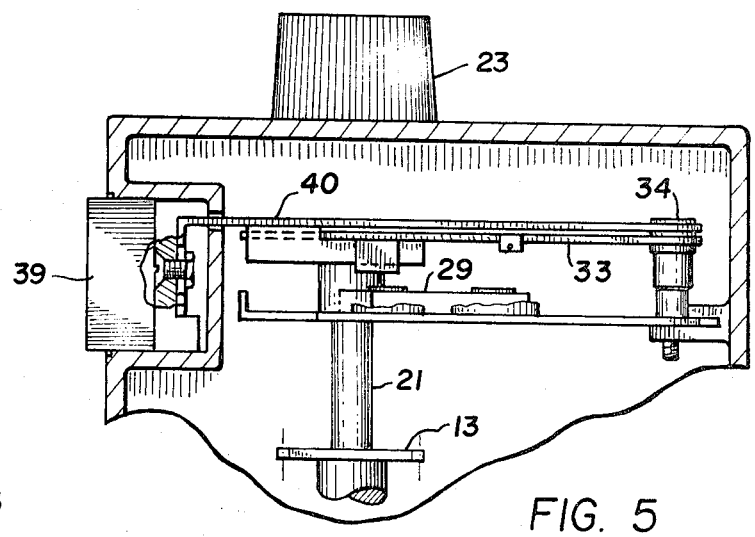

The details of a preferred embodiment of the inventive film advancing mechanism are best shown in FIGS. 3 – 5. A shaft 21 carries sprocket 13, and shaft 21 is turned a step at a time to advance filmstrip 12 one frame for each step. A sleeve 22 carried on shaft 21 is both rotatable and axially movable relative to shaft 21, and sleeve 22 is used for advancing and detenting shaft 21 as explained more fully below.

A knob 23 is secured to shaft 21 and extends over sleeve 22. A clutch part 24 on sleeve 22 faces a confronting clutch part 25 on the base of knob 23 to provide a clutch engagement between sleeve 22 and shaft 21 through knob 23. Clutch part 24 is fixed on sleeve 22, and knob 23 and shaft 21 are movable axially relative to sleeve 22. A compression coil spring 26 abuts against clutch part 24 and flange 27 of knob 23 which is fixed to shaft 21. Spring 26 thus urges knob 23 and shaft 21 to the left as illustrated in FIG. 4, to keep clutch parts 24 and 25 normally engaged so that shaft 21 turns with sleeve 22.

If knob 23 is pushed to the right as illustrated in FIG. 4 to compress spring 26, clutch parts 24 and 25 are disengaged so that shaft 21 can be turned independently of sleeve 22 for accurate framing of filmstrip 12. Sleeve 22 is held still in a detented position while shaft 21 is turned for framing, and release of knob 23 after framing re-engages clutch parts 24 and 25 to set sleeve 22 and shaft 21 in the proper angular relationship for advancing filmstrip 12 accurately, frame-by-frame.

A detent region 28 of sleeve 22 is made square, and a resilient arm detent 29 engages detent region 28 to stop sleeve 22 at successive 90° rotational positions. Sprocket 13 is sized relative to filmstrip 12 to advance filmstrip 12 one frame for each 90° rotation so that after proper framing, detent arm 29 cooperates with detent region 28 to position successive frames of filmstrip 12 for accurately framed projection.

Figure 3A:
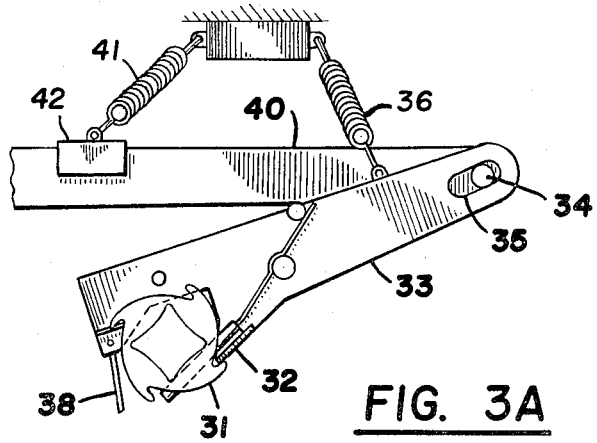

A ratchet 30 on sleeve 22 has four teeth 31 corresponding to the four sides of detent region 28, and a pawl 32 carried on pawl lever 33 is arranged for engaging and advancing the teeth 31 of ratchet 30. Pawl 32 is vertically pivotal so it can be depressed, as best shown in FIGS. 3 and 3a, to drive ratchet 30 clockwise, as illustrated, in a 90° turn for detented film advance. Pawl lever 33 is carried on pivot pin 34 for this purpose, and a slot 35 in pawl lever 33 allows some longitudinal motion of lever 33 on pin 34 as well as pivotal motion. A spring 36 fixed to projector 10 biases pawl lever 33 upward for return motion after each actuation.

Automatic advance of filmstrip 12 is accomplished by solenoid 37 coupled to pawl lever 33 by connecting arm 38 so that energization of solenoid 37 pulls down arm 38 to depress lever 33 and force pawl 32 against a tooth 31 for a 90° advance of ratchet 30. Solenoid 37 is preferably energized on a signal from synchronizer 19 in response to tape deck 20 to advance filmstrip 12 one frame on each signal from a tape.

Manual advance is accomplished by push-button 39 carried on lever arm 30 which is pivoted on pin 34 and biased upward by spring 41. Lever arm 40 has a projection 42 that overlies pawl lever arm 33 so that when arm 30 is depressed by button 39, projection 42 forces pawl lever arm downward to actuate ratchet 30. When pawl arm 33 is actuated by solenoid 37, button 39 and arm 40 remain upward under the bias of spring 41.

Figure 6:
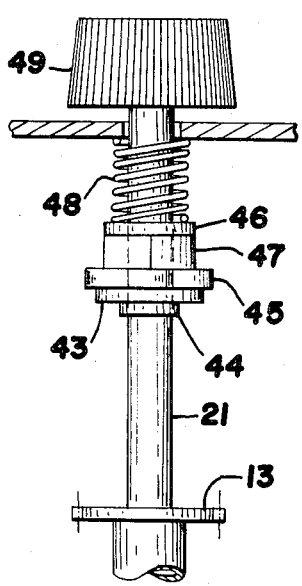
FIG. 6 is a partially schematic view of an alternative embodiment of a portion of the inventive filmstrip advancing mechanism.

FIG. 6 shows an alternative arrangement for detenting and advancing sleeve 46 on shaft 21 carrying sprocket 13. A clutch part 43 is secured to shaft 21 by collar 44, and one face of a four-tooth ratchet 45 on sleeve 46 engages clutch part 43 for a clutching action. A square detent region 47 is arranged adjacent ratchet 45, and a spring 48 between knob 49 and sleeve 46 provides the axial bias for normal engagement of clutch part 43 with ratchet 45. Pushing knob 49 inward disengages clutch part 43 to allow framing as described above, and the operation of a pawl with ratchet 45 and a detent against detent region 47 is the same as previously described.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand that many variations and alternatives can be used to fit the circumstances of particular front and rear screen projectors.

We claim:

1. An improved filmstrip advancing mechanism for a filmstrip projector, said advancing mechanism comprising:
  a. a rotatable shaft;
  b. a sprocket turned with said shaft to advance said filmstrip;
  c. a sleeve on said shaft;
  d. said sleeve being rotatable and axially movable relative to said shaft;
  e. a first clutch part on said shaft;
  f. a second clutch part on said sleeve;
  g. a spring arranged for biasing said first and second clutch parts together so said shaft normally turns with said sleeve;
  h. a manually turnable knob on said shaft for turning said shaft;
  i. said knob being arranged to move axially to compress said spring to disengage said clutch for turning said shaft relative to said sleeve;
  j. said sleeve having circumferentially evenly spaced detentable regions;
  k. a resilient detent disposed to engage said regions for stopping said sleeve at successive frame positions of said filmstrip;
  l. a ratchet arranged on said sleeve;
  m. said ratchet having a number of teeth equal to the number of said detentable regions;
  n. a pawl pivotally mounted on said projector to engage and advance said ratchet teeth;
  o. pawl including a vertically reciprocal lever; and
  p. means on said projector for actuating said pawl.

2. The filmstrip advancing mechanism of claim 1 wherein said pawl actuating means includes a solenoid arranged for depressing said pawl lever.

3. The filmstrip advancing mechanism of claim 1 including a manually depressable button, and means for depressing said pawl lever when said button is depressed.

4. The filmstrip advancing mechanism of claim 3, wherein said pawl actuating means includes a solenoid arranged for depressing said pawl lever.

* * * * *